METHOD OF MANUFACTURING RECORDING HEADS

Filed June 25, 1964 2 Sheets-Sheet 1

INVENTOR
BERNARD SCHWARTZ

BY Robert W. Ely
ATTORNEY

Nov. 19, 1968 B. SCHWARTZ 3,411,202

METHOD OF MANUFACTURING RECORDING HEADS

Filed June 25, 1964 2 Sheets-Sheet 2

United States Patent Office 3,411,202
Patented Nov. 19, 1968

3,411,202
METHOD OF MANUFACTURING RECORDING HEADS

Bernard Schwartz, Poughkeepsie, N.Y., assignor to International Business Machines Corporation, New York, N.Y., a corporation of New York Filed June 25, 1964, Ser. No. 377,810
2 Claims. (Cl. 29—603)

ABSTRACT OF THE DISCLOSURE

A magnetic recording head is formed by laminating a plurality of ferrite sheets having at least one end carrying a nonmagnetic electrical conductor thereon. Cutting the laminated sheets into a predetermined shape and thereafter sintering the same to provide said magnetic recording head.

This invention relates to magnetic transducer heads and more particularly concerns a method of manufacturing therefor and the resulting magnetic heads.

Magnetic heads are used for recording upon, and reproducing from, a magnetic material upon a suitable carrier. A typical head is comprised of an electromagnet having closely-spaced pole tips to give a non-magnetic gap. A magnetic tape is passed over the gap and poles for recording a playback by feeding a signal to, or by generating a signal in, a coil wound around the core of the electromagnet.

In order to obtain the non-magnetic gap, a common method of manufacture involves making two C-shaped halves having the gap between confronting ends or pole faces of the halves. Optical polishing and placement of non-magnetic foil between the pole faces were required and constitute expensive and complicated procedures. Such a method also gives a top or back interface or gap which is undersirable. Further, use of a non-magnetic foil gives undersirable stresses and does not permit fabrication of the very small gap length (relative to the moving tape) or thinness which is required for greater miniaturization.

The usual method for making the electromagnetic coil at the top of the core body involves the winding of copper wire about the coil bar. Ovbiously this operation is expensive as to time and equipment. Further, the use of wire contributes to size exteriorly of the profile of the coil bar and thus limits smallness by requiring space.

An object of the present invention is to provide an improved method of manufacturing magnetic heads which is less complicated and expensive, permits smaller sizes and avoids the undesirable back or top gap.

A further object is the provision of an improved method and a magnetic head wherein by laminating particular ferrite sheets having strip means thereon and by removing portions, a magnetic head results which has a thin strip means embedded therein with edges exposed and is integral without a back gap.

Another object is the provision of such a method and magnetic head wherein the strip means is a non-magnetic strip forming a very thin gap.

Another object is the provision of such a method and magnetic head wherein the strip means is conductive strips having parts exposed for connection by printed conductor paths to form a coil or winding.

Another object is the provision of such a method and magnetic head wherein the gap and coil are formed by steps including laminating of unsintered ferrite strips and forming such sheets into a core body.

In accordance with the invention, a slurry containing ferrite and a binder are formed into sheets. These sheets receive thin strip depositions at one or both end parts of the strips. The sheets are then laminated to form solid, integral machinable magnetic head blanks. By a removing step, the magnetic head is formed and has a non-magnetic gap or coil strips or both. With the magnetic gap, the head is next sintered to give an integral head having only the gap. With coil strips, further strip depositions are made to connect end edges and then the core body is fired.

The realization of the above objects along with the features and advantages of the invention will be apparent from the following description and the accompanying drawings in which.

Figure 1:
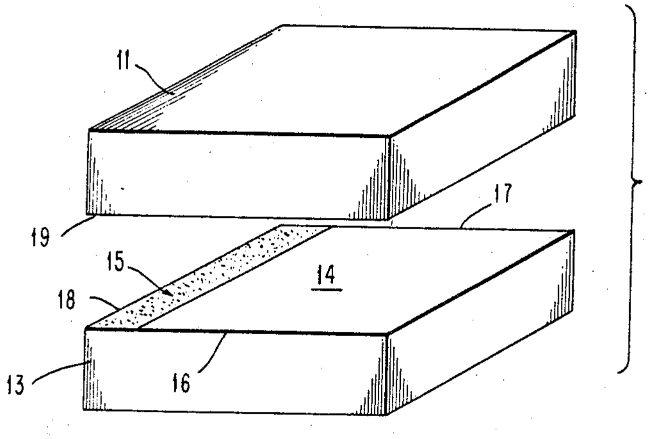
FIGURE 1 is a side isometric view of two sheets of feritte-powder-containing material, one of which has a strip of non-magnetic material thereon.

Referring to FIGURE 1 of the drawing, an upper and a lower rectangular sheet are respectively designated by reference numerals 11 and 13. Both sheets 11 and 13 are formed by spreading by conventional doctor-blading technique from a slurry mixture of ferrite and a thermoplastic binder dissolved in a suitable carrier liquid, such as a mixture of toulene and ethanol or methyl ethyl ketone. The ferrite powder is $Fe_2O_3$, nickel and zinc, or $MnZnFe_2O_4$, while the finely-divided thermoplastic is polyvinyl butyrol or polyvinylacetate-polyvinylchloride. The proportions by weight are about 212 parts ferrite to 8.5 parts thermoplastic to 8.0 parts carrier liquid so that the paint-like mixture is suitable for spreading on a flat surface and for rapid drying to form paper-like sheets. Other additives, such as plasticizers and wetting agents, may also be used. The lower sheet 13 has silk-screened thereon on its left end part of top surface 14 of strip 15, a non-magnetic paste material comprised of an organic binder-vehicle and finely divided platinum or palladium which extends between side edges 16 and 17 and end edge 18. The facing lower surface 19 of the upper sheet does not have a corresponding strip of non-magnetic material, although it can if desired. The sheets 11 and 13 with air drying rapidly lose the solvent and have a cohered paper-like structure which permits handling and stacking. The preferred thin layer strip 15 is a commercially available platinum paste having beta terpinol (with ethyl cellulose as a thickener) and is deposited by the well known silk screen technique. Other "printing" or deposition methods, such as transfer print, decal, evaporative deposition or sputter deposition can be used, if desired or required.

Figure 2:
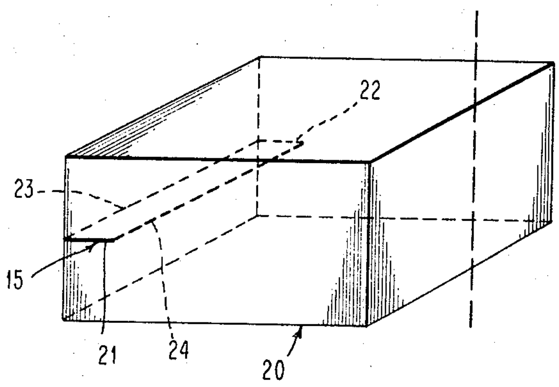
FIGURE 2 is a side isometric view of a monolithic structure, resulting from laminating the two sheets.

In FIGURE 2 it can be seen that the sheets 11 and 13 of FIGURE 1 have been exactly aligned to give coplanar edges and then joined to form laminated unitary block structure 20 with strip 15 of non-magnetic material embedded inwardly from the left edge wtihout a sheet interface. This lamination or bonding is effective by moderate heat (90°–150° C.) and moderate pressure (500–1200 p.s.i.). During lamination, the non-magnetic material becomes somewhat cohered with some flow of the binder. The conditions are such that the thermoplastic flows and forms a bond only at the interface. A relatively firm, cardboard-like structure which is suitable for operations, such as punching, stamping, ultrasonic slicing or cutting, results. Strip 15 has two end edges 21 and 22 exposed and has its left side edge 23 exposed while the right edge 24 is encased.

Figure 3:
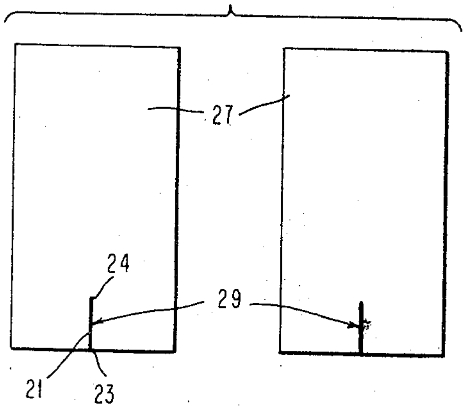
FIGURE 3 is a front elevation view of two blocks, resulting from lengthwise cutting of the FIGURE 2 structure.

In FIGURE 3, two block 27 are shown as results from cutting or sawing lengthwise (dashed lines) in a plane perpendicular to the surface of strip 15 the laminated block structure 20 of FIGURE 2. Each block 27 has a non-magnetic gap 29 resulting from severing strip 15. It is apparent that a single block could be made of relatively large number of blocks by seelction of different sizes for the starting sheets.

Figure 4:
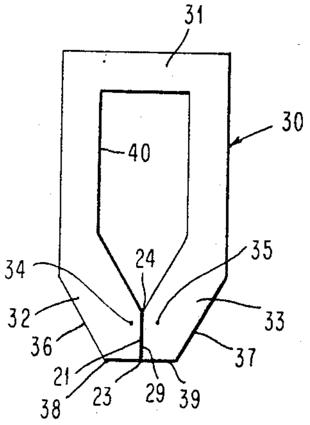
FIGURE 4 is a core having a non-magnetic gap as formed by removing a center portion and bottom corners from a FIGURE 3 block.

The next step in making the magnetic head of FIGURE 4 is stamping out or otherwise removing the center portion or part of a FIGURE 3 block and cutting off the bottom corners. The center part is so removed as to provide an inverted U-shaped part 30 having horizontally extending coil bar 31 and two depending legs with converging projections 32 and 33. The top or inner surfaces of the projections or poles 32 and 33 are inclined downwardly toward each other and the confronting pole tips or ends 34 and 35 of the inclined projections are completely separated by gap 29. The outersurfaces 36 and 37 of the projections are similarly inclined and merge to short flat horizontal surfaces 38 and 39, terminating at gap 29 to form a generally-square-O-shaped magnetic head or core having a gap. It is to be noted that edge 24 of strip 29 is coplanar with the continuous inner core surface and thereby exposed at the central opening 40. The strip 29 also has outer edge parts 23 coplanar with the bottom horizontal segment of the core external surface formed by surfaces 38 and 39. The edge parts 23 and 24 are connected by the remaining connecting portion of strip 29. After sintering, the core body 30 and gap 29 form a monolithic structure without a back gap. The sintering is done by heating to 1150°–1300° C. for ten hours whereby the binders burn out, the ferrites form larger particles and contract, and the metal phase gap material shrinks or contracts with the ferrite ceramic so that stresses are not set up. This thickness of the gap 29 is 100 Angstroms to ½ mil with the lower dimension being thinner than previously attained.

In practicing the invention as disclosed in FIGURES 1–4 and described above, a slurry is formed of powdered ferrite, a finely-divided binder and a carrier liquid. The sheets 11 and 13 are formed by spreading and drying. Strip 15 is deposited as a thin layer of platinum paste between the side edges and along an end edge of an end part of sheet 13. The sheets 11 and 13 are then aligned and laminated by applying moderate heat and pressure below the sintering temperature of the ferrite. A unitary block structure 20 results. Block 27 is formed and has strip or gap 29 with an encased inner or side edge 24 and two exposed end edges 21. A center portion is then removed to expose the previously-encased edge 24 and provide a non-magnetic gap 29. Finally the recording head blank is heated to burn out the binders and to sinter (with solid state growth) the ferrite with the very thin platinum gap equally contracting.

Figures 5, 6, 7, 8:
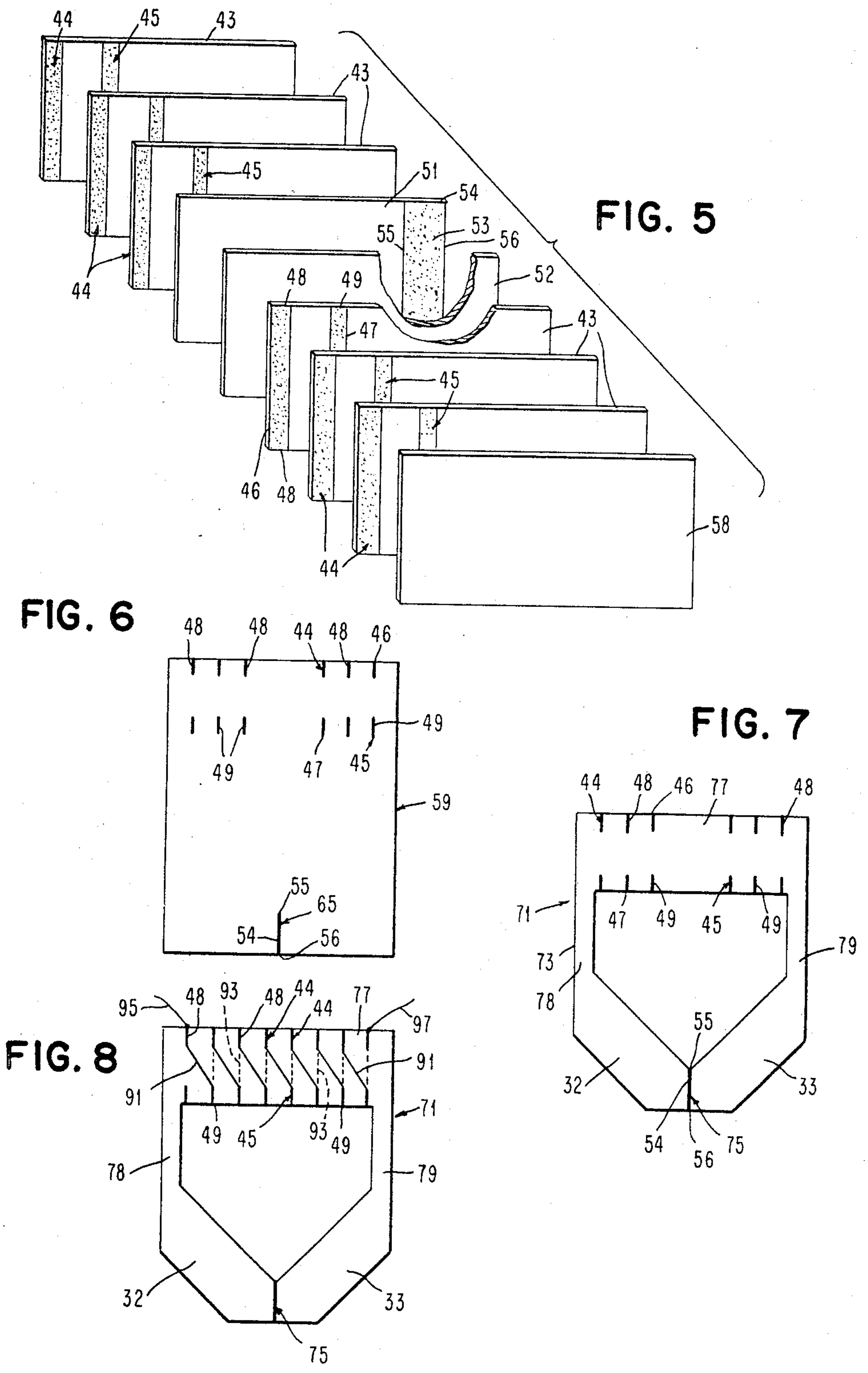
FIGURE 5 is a view of a group of ferrite sheets having a gap strip on a central sheet and winding strips on end strips.
FIGURE 6 is a front view of the monolith resulting from laminating the sheets and arranging the non-magnetic gap at the bottom.
FIGURE 7 is a front view of the core resulting from removing a center portion and corners from the FIGURE 6 monolith and has horizontally-extending winding strips in the cross member.
FIGURE 8 is a front view of the final magnetic head with a winding of increased length having two external leads.

Referring to FIGURE 5 wherein the sheets which are necessary to form a similar magnetic head but with the addition of a winding are shown, six similar sheets 43 each having two conductive coil strips 44 and 45 at their left or top end part are shown. The strips 44 have a side edge 46 coplanar with the left end edge of the sheets while strip 45 has a side edge 47 which will be encased. Strips 44 and 45 respectively, have upper and lower end edges 48 and 49 which are coplanar with the side edges of the sheets 43. Two magnetic gap sheets 51 and 52 are at the center. Sheet 51 has a non-magnetic strip 53 deposited along the right or bottom end part thereof by the method above described. As with the FIGURE 1 gap, the strip 53 has two end edges 54 which are coplanar with the upper and lower side edges of sheet 51. Strip 53 also has an encased side edge 55 and an exposed side edge 56 which is coplanar with the right edge of sheet 51. At the front of the group of staggered spaced sheets, the end sheet 58 appears and does not have winding strips on its front face, nor on its back surface. Center sheet 52 is likewise devoid of any strips on either front or back surface. The parallel winding strips 44 and 45 are respectively located along the left edge surface and spaced inwardly and appreciably therefrom on the surface of end part of sheets 43. Strips 44 and 45 are deposited by silk screening or otherwise "printing," at the desired locations, as a paste of conductive material, such as platinum or palladium. A refractory metal such as tungsten or molybdenum can be used, if a protective atmosphere is provided during sintering.

In FIGURE 6, the various like-sized sheet 43, 51, 52, and 58 have become a unitary laminated block 59 without interfaces but with a strip end edges 48 and 49 appearing in this front view of the block 59. The top and inner winding strip end edges 48 and 49 are exposed at the surface since they were coplanar with the sides of the sheets. The upper side edges 46 are exposed while bottom side edges 47 are encased. The end edges 54 and bottom or side edge 56 of the non-magnetic gap 65 are also exposed while edge 55 is encased. It is to be noted that the right sheet 43 is twice as thick as the other winding strip sheets 43 to equalize the end cover sheet 55 which does not have a winding strip on its left exposed surface.

In FIGURE 7, the unsintered ferrite magnetic head 71 has been formed by stamping out the central part and removing the corners of the FIGURE 6 block. It is to be noted that the central opening exposes the side edges 47 of inner coil strips 45 to give structure which is comparable to the FIGURE 4 operation. The result of stamping is an inverted U-shaped core body 73 and a non-magnetic gap 75. The laterally-extending cross bar 77 of the body has at the top front the end edges 48 of the set of winding strips 44 and at the bottom the end edges 49 of the set of strips 45. The depending arms 78 and 79 respectively have inwardly inclined poles or projections 32 and 33, as above described with reference to FIGURE 4. The transversely extending strip side edges 46 are exposed at the outer horizontal surface of coil bar 77 and the side edges 47 are exposed at the continuous inner core surface, comparable to the FIGURE 4 showing of gap 29.

In FIGURE 8, it can be seen that the winding strips 44 and 45 are connected by diagonal printed conductors 91 on the front surface of bar 77 and by vertical conductors 93 (dashed lines) on the back surface of bar 77 to form a winding which can be externally connected by left lead 95 and right lead 97. It is to be noted that the material of the center sheets 51 and 52 had both been provided in FIGURE 8 with winding strips 44 and 45 to give central strips and thus increased length to the winding. After depositing the diagonal front conductors 91 and vertical back conductors 93, the unitary recording head is sintered by heating to 1150°–1300° C. for ten hours whereby the ferrite, non-magnetic gap material and conductor substance are hardened. The binders are burned out during sintering. The diagonal and vertical conductors 91 and 93 are deposited by silk screening the platinum paste. It is to be noted that the connection to the relatively extensive strip end edges 48 and 49 is easily accomplished and avoids the highly difficult task of forming around a corner and getting a reliable conductive path. Obviously the conductors 91 and 93 could be formed after sintering, although another operation would be involved. The strip conductors 91 and 95 are $\frac{1}{10}$ to 2 mils in thickness as are strips 44 and 45 and actually would have a width comparable to the strips, although shown as lines in the interest of clarity.

In practicing the invention disclosed in FIGURES 5 to 8, it is apparent that most of the steps and materials remain the same and thus equivalent steps will not again be described. Further, it is apparent that the method of making the core winding can be practiced without forming the non-magnetic gap. The sheets 43, 51, 52 and 58 are formed from the slurry and, in addition to gap strip 53, are provided with platinum paste strips as sets 44 and 47. After laminating, strips 44 have edge exposure at outer surfaces comparable to the edge exposure gap strip 53 which is the same as the previously described gap strip 29. The step of removing is as previously described except edges 47 are exposed. Before the sintering step, the conductors 91 and 93 are deposited and overlay the end edges to make connections without turning a corner to provide a continuous electromagnetic coil upon sintering. Finally, the leads 95 and 97 are attached by conventional soldering.

From the foregoing, it is apparent that the noted disadvantages have been avoided and that a relatively simple, low cost, batch method is provided. The resulting products have very thin, non-magnetic gaps which give miniaturized, high quality recording heads and have a compact, durable electromagnetic coil provided by embedded and surface strips.

It is to be understood that changes can be made by persons skilled in the art in the invention as herein disclosed without departing from the scope of the invention.

What is claimed is:

1. The method of manufacturing magnetic recording reproducing heads comprising the steps of:

forming a slurry from a mixture of ferrite powder, a finely-divided thermoplastic binder, and a carrier liquid;

spreading said slurry into sheet form and forming a plurality of said sheets having parallel sides;

drying said sheets;

depositing a thin strip of electrically conductive-nonmagnetic material along one of the sides of at least one of said sheets of said plurality;

stacking and aligning said plurality of sheets into a predetermined pattern;

heating said sheets to a temperature below said sintering temperature of said ferrite material while applying moderate pressure to align and laminate said sheets into a unitary block structure with out a discernible interface;

removing the center portion and bottom portions of said ferrite sheets, thereby leaving an inverted U-shaped part having a horizontally extending coil bar and two depending legs with converging projections with pole tips separated by said electrically conductive-nonmagnetic material; and , depositing conductive material on said coil bar to provide an electromagnetic coil about said coil bar.

2. The method of manufacturing magnetic recording reproducing heads comprising the steps of:

forming a slurry from a mixture of ferrite powder, a finely-divided thermoplastic binder and a carrier liquid;

spreading said slurry into sheet form and forming a plurality of rectangularly shaped sheets;

stacking and aligning said sheets into a predetermined rectangular pattern;

depositing a thin layer of electrically conductive-nonmagnetic paste along one side portion of the centrally located sheets of said plurality of rectangular shaped sheets such that the deposited sections are coplanar;

heating said plurality of sheets to a temperature below the sintering temperature of said ferrite mixture while applying moderate pressure to align and laminate said sheets into a unitary block structure without a discernible interface;

removing the center and bottom portions of said ferrite sheet block structure leaving an inverted U-shaped part having a horizontally extending coil bar and two depending legs with converging projections wherein the faces of said converging projections are pole faces separated by said electrically conductive-nonmagnetic material; and, applying conductive paste on said coil bar to provide an electromagnetic coil about said coil bar.

References Cited

UNITED STATES PATENTS

| | | | |
|---|---|---|---|
| 2,677,019 | 4/1954 | Buhndorf | 179—100.2 |
| 3,339,190 | 8/1967 | Kaufman | 340—174 |
| 2,961,709 | 11/1960 | Eichbaum et al. | 29—608 |
| 3,040,301 | 6/1962 | Howatt et al. | 29—155.5 |
| 3,123,748 | 3/1964 | Brownlow | 29—155.5 |
| 3,229,265 | 1/1966 | Brownlow et al. | 340—174 |
| 3,247,573 | 4/1966 | Noack | 29—602 XR |

OTHER REFERENCES

Washington Post, Chester Gould, Dick Tracy comics, July 31, 1963.

IBM Tech. Disclosure Bulletin, Fabricating Ferrite Magnetic Heads, by E. C. Schuenzel, vol. 4, No. 1, June 1961.

JOHN F. CAMPBELL, *Primary Examiner.*